United States Patent [19]

Selcukoglu

[11] 4,001,116
[45] Jan. 4, 1977

[54] GRAVITATIONAL SEPARATION OF SOLIDS FROM LIQUEFIED NATURAL GAS

[75] Inventor: Yuksel Ali Selcukoglu, Naperville, Ill.

[73] Assignee: Chicago Bridge & Iron Company, Oak Brook, Ill.

[22] Filed: Mar. 5, 1975

[21] Appl. No.: 555,354

[52] U.S. Cl. .................................. 210/83; 62/10; 62/13; 210/180; 210/534; 210/539
[51] Int. Cl.² .......................................... F25J 3/00
[58] Field of Search ............... 61/.5; 62/10, 12, 13, 62/35; 210/38 A, 83, 84, 180, 187, 207, 534, 537, 539, 540, 521

[56] References Cited

UNITED STATES PATENTS

| 883,608 | 3/1908 | Antoine | 210/207 |
|---|---|---|---|
| 1,020,013 | 3/1912 | Arbuckle | 210/521 |
| 2,054,791 | 9/1936 | Del Mar | 210/187 X |
| 2,917,176 | 12/1959 | Bowers | 210/180 |
| 2,996,891 | 8/1961 | Tung | 62/12 |
| 3,203,192 | 8/1965 | Tafreshi | 62/12 |
| 3,283,521 | 11/1966 | Harmens | 62/12 |
| 3,398,544 | 8/1968 | Crownover | 62/12 |
| 3,617,544 | 11/1971 | Voss | 210/207 X |
| 3,798,918 | 3/1974 | Maher et al. | 62/12 X |

*Primary Examiner*—Charles N. Hart
*Assistant Examiner*—R. G. Mukai
*Attorney, Agent, or Firm*—Merriam, Marshall, Shapiro & Klose

[57] ABSTRACT

A gravitational separator for separating solids from liquefied natural gas having a closed tank having a conical lower portion angled at least 60° from the horizontal and terminating at the bottom in an apex opening in communication with a valve means for removing settled solids from the tank, a vertically positioned cylindrical shell, defining a stilling chamber, located at least partially below a predetermined level of liquified gas, a conical shell vapor disengaging means located above the stilling chamber, conduit means for feeding a gas or liquefied gas containing impurities terminating in the stilling chamber below the level of a liquefied gas in the tank, means for withdrawing a gas or vapor from the tank.

A process of separating impurities from a stream of methane by feeding the stream to a tank through a conduit terminating inside of a stilling chamber beneath the level of liquefied methane, said stilling chamber being defined by a cylindrical shell located in the tank at a position to depend at least partially below a level of liquefied methane in the tank and extending to below the terminus of the feed conduit, said tank being closed and having a conical lower portion angled at least 60° from the horizontal and terminating at the bottom in an apex opening in communication with a valve, settling out solidified impurities in the lower portion as a slurry with liquefied methane, removing the slurry, and withdrawing methane vapor from the upper space of the tank.

7 Claims, 1 Drawing Figure

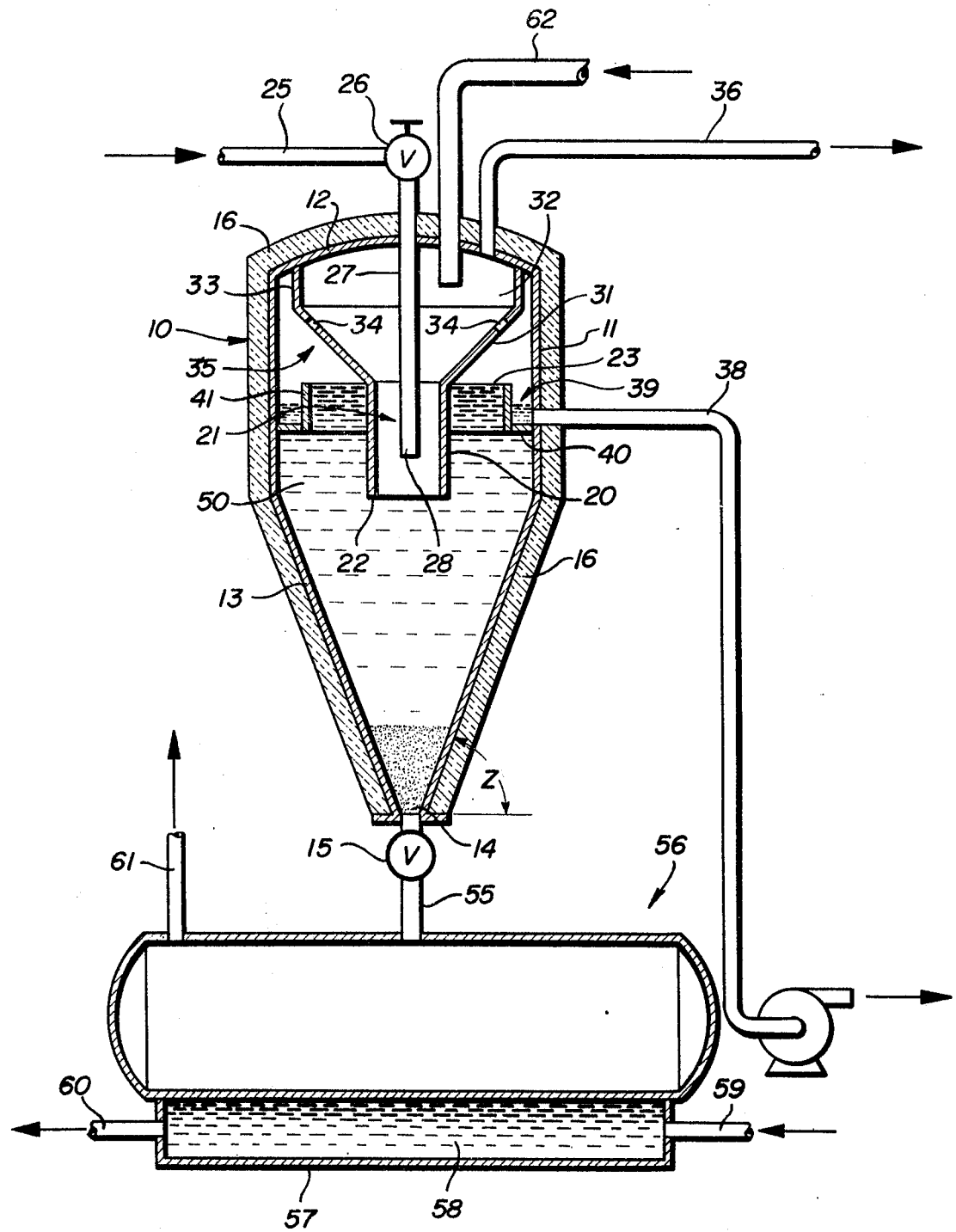

GRAVITATIONAL SEPARATION OF SOLIDS FROM LIQUEFIED NATURAL GAS

This invention relates to apparatus and methods for the purification of gases, in vapor and liquefied form, containing impurities. More particularly, this invention provides novel apparatus and methods for the purification of methane, in vapor and liquefied form, containing various impurities.

In the processing and treating of many gases it is necessary that the gases be substantially cooled or lowered in temperature. Regardless of whether the cooled gas remains wholly or partially in vapor form, or is wholly or partially liquefied by the cooling, normally gaseous impurities present in the gas are often cooled to solidification. The presence of solids in the cooled gas is highly undesirable because they tend to coat equipment and plug piping and valves. This is a particularly serious problem when methane containing carbon dioxide, water, hydrogen sulfide and mercaptans, is liquefied.

Methane (i.e., natural gas) is widely used industrially and by consumers as a source of fuel for heating, cooking and air conditioning. It must be reasonably pure, not only because of the end uses to which it is put, but because in some instances the methane is liquefied for storage. Unless the carbon dioxide is removed from liquefied methane before it is fed to storage the solidified, crystallized, carbon dioxide can coat out in the equipment and settle out in the storage tank and possibly plug up the tubes and pipes used to fill and empty it. The crystallized carbon dioxide can also accumulate in the storage tank and thereby reduce the effective storage volume of the tank for liquefied methane.

Since carbon dioxide is generally present in natural gas, which is the main source of methane at the present, a number of means have been developed and are used to remove or lower the amount of this impurity in the natural gas. The systems most extensively used are believed to be those which employ molecular sieves or solvent extraction techniques. These systems are costly to construct, operate and maintain because of the large amount of natural gas which must be purified.

A considerable number of other methods of removing frozen-out impurities from methane, and particularly natural gas, have been proposed. Twomey in U.S. Pat. Nos. 2,082,189 and 2,090,163 proposed the use of a trap for removing carbon dioxide. The natural gas was to be condensed at high pressure, so as not to freeze out the impurities in the condenser tubes, and then the gas would enter the trap where the carbon dioxide and other frozen impurities would drop out. Experience has shown that such a system is unpredictable and uncontrollable.

Kurata et al. in U.S. Pat. No. 2,900,797 describe a liquid cyclone for removing solidified impurities from natural gas. Actual testing, however, has shown that the carbon dioxide is present in the liquefied natural gas in the form of fine solid particles. Specifically, most of the solid carbon dioxide particles are within the range of 10 to 100 microns with a significant percentage having a particle diameter of about 20 to 30 microns. Some particles are even smaller than 10 microns in diameter. It has been found that a liquid cyclone will not remove particles in the 20 to 30 micron diameter range because they lack the necessary settling velocities. Moreover, the solidified carbon dioxide particles stick to each other and the tackiness of the particles renders ineffective conventional cyclones, as well as strainers and other equipment containing restrictions. The unsuitability of liquid cyclones for removing solidified carbon dioxide particles from liquefied natural gas is evidenced by the lack of any commercial installation of such equipment at a natural gas liquefaction facility. Experience in existing liquefied natural gas plants shows that carbon dioxide solids are very difficult to handle. When conventional pre-treatment systems malfunction and allow as much as 2000 ppm of carbon dioxide to flow through the liquefaction equipment, plugging occurs at valves, pipe lines and heat exchangers.

There is accordingly a need for apparatus and processes for efficiently and economically removing impurities from natural gas which solidify when the natural gas is cooled.

According to the present invention there is provided a novel gravitational separator for separating impurities which solidify when natural gas, i.e., methane is cooled. The methane can be either in the form of a vapor containing the impurities in the form of a gas or solid, a mixture of the methane in vapor and liquid form or the methane can be essentially only in liquid form. The separator includes as an essential part thereof a closed tank having a conical lower portion angled at least 60° from the horizontal and terminating at the bottom in an apex opening in communication with a valve means for removing settled solids from the tank when the valve is open. Experiments have shown that solids produced at low pressure (15 to 25 psia) and low temperatures ($-260°$ to $-220°$ F), such temperatures being far below the freezing points of the solids, can be settled and pistoned out from a conical separator. At warmer temperatures the solids are tackier in character and agglomerate and stick to surfaces and present a difficult removal problem. The tank also includes a vertically positioned cylindrical shell, defining a stilling chamber, located in the tank at a position to depend at least partially below a predetermined liquefied methane level in the tank.

The tank is provided with a conduit means for feeding impure or contaminated methane, as a vapor, liquid or mixture thereof, into the tank. The conduit means advisably terminates in the stilling chamber at a location below the predetermined liquefied methane level in the tank so that the feed stream is fed below the liquid level in the tank. The tank advisably also includes means for withdrawing clean liquefied methane from the tank, while maintaining a predetermined liquid level in the tank, without withdrawing more than an insignificant amount of solids with the withdrawn clean liquid. Also provided is a means for withdrawing methane vapor from the upper interior space of the tank.

The minimum 60° slope of the conical bottom portion of the tank is important to avoid the accumulation of solids, such as solidified carbon dioxide, on the interior surface. An angle less than 60° from the horizontal does not avoid solids accumulation on the tank internal surface. Although the angle of the cone can be greater than 60° from the horizontal, it is generally undesirable to increase the angle to more than 80°. The tank would become excessively high with an angle greater than 80° and no advantage would be achieved for the extra cost involved in such a construction. The presently recommended angle is 75°. Experiments showed that a 45° cone could not be used. The solids adhered to the conical shell with resulting bridging and plugging. The steepness of the cone is essential in that it provides an additional pistoning effect on the settled solids. With the aid of this action the slurry is ejected at the apex 14 with no plugging. In order to avoid plugging, it is very advisable to discharge the slurry directly through a free-opening valve located in a straight conduit or run of pipe which discharges into a cylindrical vessel. Changes in direction of piping, horizontal runs, etc. could cause plugging.

According to a further aspect of the invention there is provided a process of separating carbon dioxide and other impurities from a stream of methane in the form of vapor, liquefied methane or a mixture of methane vapor and liquefied methane, by feeding the stream to a tank by means of a feed conduit terminating inside of a stilling chamber, beneath the level of liquefied methane in the tank, said stilling chamber being defined by a cylindrical shell located in the tank at a position to depend at least partially below a level of liquefied methane in the tank and extending to below the terminus of the feed conduit, said tank being closed and having a conical lower portion angled at least 60° from the horizontal and terminating at the bottom in an apex opening in communication with a valve, settling out and collecting solidified carbon dioxide and other impurities in the conical lower portion of the tank as a slurry of the solids in liquefied methane, removing the slurry from the tank through the valve periodically or continuously, and withdrawing clean methane vapor from the upper interior space of the tank. The process also includes withdrawing clean liquefied methane from the tank, without withdrawing a significant amount of solidified carbon dioxide or other solidified impurities, when the process is operated in a way which increases the amount of liquefied methane in the tank.

The invention will be described further in conjunction with the attached drawing.

With reference to the attached drawing, the gravitational separator embodiment of this invention as illustrated therein includes a closed tank 10. The tank 10 has an upper circular cylindrical shell portion 11, a dished shell top 12 and a lower conical shell portion 13 which terminates in an apex 14 which is in communication with valve 15. The entire outer surface of tank 10 is advisably covered by insulation 16. The insulation retards heat leak and thus prevents bubble formation which would create turbulence in the liquefied methane in the tank.

The angle Z of the conical portion from a horizontal line is in the range of 60° to 80°. A minimum 60° angle of slope has been found necessary to prevent solidified materials from depositing on and building up on the internal surface of the conical portion of the tank.

Vertical cylindrical shell 20 is centrally positioned inside of the tank 10 and defines a stilling chamber 21. The bottom edge 22 of the cylindrical shell 20 is positioned or located to be at least partially below the level 23 of the liquefied methane 50 in the tank.

Conduit 25 communicates with valve 26 and from valve 26 conduit 27 extends downwardly to terminate at end 28. The end 28 of conduit 27 terminates above the bottom edge 22 of cylindrical shell 20. This arrangement preferentially directs the solids downwardly inside of the cylindrical shell 20 into the lower liquid contents of the tank and retards movement of the solids with vapor into the upper part of the liquid in the tank.

An important element useful in the separator of this invention is the shell 31 which defines vapor disengaging and expansion chamber 32. The shell 31 has a surface of revolution extending from the top part of the cylindrical shell 20 to the tank interior surface. As shown in the drawing it has a conical shell section which is joined at its upper end to a vertical cylindrical portion 33 which is joined at its top edge to the interior surface of the tank top 12. The purpose of the vapor disengaging and expansion chamber 32 is to receive gas or vapor which flows upwardly from the stilling chamber 21 and to decrease its velocity so that the chance of entraining solids with the vapor is reduced or lowered. As a result, the vapor or gas which exits from the tank by conduit 36 is less likely to have solid particles included in the exit stream. Holes 34 in the upper part of shell 31 permit methane vapor to flow from space 35 into vapor disengaging and expansion chamber 32. The conical shape of shell 31 provides a surface which is continually washed by splashing liquid from the cylindrical shell 20 portion of the stilling chamber. This washing is sufficient to prevent a build-up of solids on shell 31.

Conduit 38 communicates with the interior of the tank for withdrawing clean liquefied methane therefrom while maintaining a predetermined liquid level in the tank. As a further means of preventing solidified material from flowing out of the tank with an exit stream through conduit 38, a weir 39 is located inside of the tank. The weir 39 includes a horizontally positioned circular flange 40 which projects inwardly from the tank wall. Projecting vertically upwardly from the inner edge of flange 40 is a cylindrical ring 41. Liquid overflows the top edge of ring 41 and flows into the resulting trough, between ring 41 and the tank wall, to the outlet or exit port which permits the liquid to flow through withdrawing conduit 38.

Liquid with solids enters liquefied methane 50 through the cylindrical portion of stilling chamber 21. The diameter of shell 11 is such that the velocity of clean liquefied methane flowing uniformly over the entire circumference of ring 41, is less than the settling velocity of the solid particles.

The apparatus of this invention can be used to remove impurities from methane by feeding the impure or dirty methane to liquefied methane in the tank before or after the impurities in the methane stream are solidified.

Methane, such as in the form of impure or dirty natural gas, can be fed through conduit 25, valve 26 and conduit 27 below the level of liquefied methane 50 in the tank. This methane stream can be at atmospheric temperature or cooled to a temperature which does not solidify the impurities at the pressure of the stream. The required liquefied methane 50 can be placed in the tank prior to startup by means of conduits 25 and 27 and the supply can be replenished in the same way. As the methane stream contacts the liquefied methane, the impurities are cooled and solidify and settle downwardly through the bottom of stilling chamber 21 into the lower interior space of conical portion 13. Continuously or periodically a slurry of solidified impurities such as carbon dioxide, water, hydrogen sulfide and mercaptans, in liquefied methane is withdrawn through valve 15 into conduit 55 which feeds the slurry to tank 56. The tank 56 is provided with a spaced away shell 57 which defines a heat sink chamber 58 through which a mixture of water and ethylene glycol is fed by means of inlet 59 and outlet 60. As the slurry of liquefied methane and solidified impurities flows into the bottom of tank 56 heat is provided by the mixture of water and ethylene glycol to thereby vaporize the liquefied methane and the solidified impurities. The resulting vapor mixture is withdrawn from tank 56 through outlet 61 for delivery to a compressor for distribution to a pipeline or other destination.

Unless the pool of liquefied methane 50 is subcooled, a stream of methane fed at atmospheric temperature or only moderately cooled, will result in continuous vaporization of the liquefied methane with a decrease in the volume of liquefied methane in the tank unless it is replenished continuously or periodically through conduit 62. The methane gas supplied by conduit 27, as well as vapors from the liquefied methane, flow upwardly through the stilling chamber 21 into the disengaging chamber 32 where the velocity of flow is lowered. The clean vapor or gas is then removed by conduit 36 and is fed to a liquefier, where it is liquefied and returned through conduit 62.

The apparatus can be used in a second embodiment of the process of this invention in which a stream of impure methane, i.e., natural gas, is cooled to a temperature and pressure which liquefies the methane but at which the carbon dioxide, water, hydrogen sulfide and mercaptan impurities are soluble in the liquefied methane. Donnelly and Katz in *Industrial and Engineering Chemistry*, 46, 511–517 (1954) and Kurata et al. in U.S. Pat. No. 2,900,797 disclose phase equilibria for the carbon dioxide-methane system which can be used to choose conditions in which the carbon dioxide is dissolved, rather than solidified, in the liquefied methane. With the liquefied methane stream at the appropriate thermodynamic state, and containing the impurities in dissolved form, it is put through a change of thermodynamic state at valve 26 to convert the dissolved impurities to solidified impurities in liquefied methane. This change in thermodynamic state may be induced by either reducing the pressure of the stream, such as at valve 26, or by reducing the temperature of the stream, such as it flows through conduit 25 near the tank. The purpose is to effect the phase change and solidify the impurities as close to tank 10 as possible so that the impurities do not have a chance to plug and coat equipment. Regardless of the manner in which the phase change is effected, the resulting stream is fed by conduit 27 to below the level of liquefied methane 50 in the tank 10. The solids settle through stilling chamber 21 into the conical portion 13 of the tank and are removed as required in the form of a slurry with some liquefied methane. Any vapors which emerge from the end 28 of conduit 27 flow upwardly through the stilling chamber 21 into the disengaging chamber 32 where the velocity of flow is lowered such that any elutriated liquid droplets or solids disengage and fall by gravity back into stilling chamber 21. The clean vapor is then removed by conduit 36 and fed to a liquefier. Clean liquefied methane overflows the top edge of cylindrical ring 41 and flows out of the tank by means of conduit 38 which feeds it to storage or to some other suitable destination.

The just described second process embodiment of the invention can be practiced using the following specific conditions:

|  | Conduit 25 | Conduit 38 | Conduit 36 | Conduit 61 |
|---|---|---|---|---|
| Flow (hr/mole) | 225 | 114 | 106 | 5 |
| Velocity (min/ft) | 1.74 | 7.5 | 0.08 |  |
| Pressure (PSIA) | 625 | 60 | 20 | 15 |
| Temp (° F) | −144 | −251 | −240 | −160 |
| Mole % methane | 91.55 | 90.42 | 93.77 | 67.81 |
| % ethane | 4.26 | 8.28 | 0.02 | 6.21 |
| % propane + | 0.54 | 1.05 | 0 | 0.79 |
| % nitrogen | 3.12 | 0.25 | 6.21 | 0.19 |
| % $CO_2$ | 0.53 | 300 to 700 ppm | 0 to 200 ppm | 25.00 |

The foregoing detailed description has been given for clearness of understanding only, and no unnecessary limitations should be understood therefrom, as modifications will be obvious to those skilled in the art.

What is claimed is:

1. A gravitational separator for separating solids from liquefied natural gas comprising:
   a closed tank having a conical lower portion angled at least 60° from the horizontal and terminating at the bottom in an apex opening in communication with a valve means for removing settled solids from the tank,
   a vertically positioned cylindrical shell, defining a stilling chamber, located in the tank at a position to depend at least partially below a predetermined level of liquefied gas which may be placed in the tank,
   a conical shell vapor disengaging and expansion means located above the stilling chamber,
   conduit means for feeding a gas or liquefied gas containing impurities into the tank and terminating in the stilling chamber at a location below the level of a liquefied gas in the tank,
   means for withdrawing a gas or vapor from the vapor disengaging and expansion means,
   means for withdrawing clean liquid from the tank, while maintaining said predetermined liquid level in the tank, without withdrawing a significant amount of solids settling downwardly in the tank,
   means for discharging slurry directly from the tank into a vessel having external heating means to vaporize the slurry, and
   insulation on the outside of the tank.

2. A gravitational separator according to claim 1 in which the conduit means for feeding the gas or liquefied gas into the tank has an end which terminates significantly above the cylindrical shell bottom so that solids are thereby preferentially directed downwardly by the cylindrical shell rather than sideways into the upper volume of the liquefied gas in the tank.

3. A gravitational separator according to claim 1 in which the means for withdrawing clean liquid from the tank includes a weir means extending above a clean liquid withdrawing conduit inlet end to confine the solids in the tank and prevent the solids from flowing out the conduit with clean liquid.

4. A gravitational separator for separating solids from liquefied natural gas comprising:
   a closed tank having a conical lower portion angled at least 60° from the horizontal and terminating at the bottom in an apex opening in communication with a valve means for removing settled solids from the tank, a vertically positioned cylindrical shell, defining a stilling chamber, located in the tank at a position to depend at least partially below a predetermined level of liquefied gas which may be placed in the tank, a conical shell vapor disengaging and expansion means located above the stilling chamber and defined by the space above a shell having a surface of revolution extending from the top part of the cylindrical shell to the tank interior surface, conduit means for feeding a gas or liquefied gas containing impurities into the tank and terminating in the stilling chamber at a location below the level of a liquefied gas in the tank, means for withdrawing a gas or vapor from the vapor disengaging and expansion means, means for withdrawing clean liquid from the tank, while maintaining said predetermined liquid level in the tank, without withdrawing a significant amount of solids settling downwardly in the tank, and insulation on the outside of the tank.

5. A process of separating impurities from a stream of methane which comprises:

feeding the stream to a tank by means of a feed conduit terminating inside of a stilling chamber beneath the level of liquefied methane in the tank, said stilling chamber being defined by a cylindrical shell located in the tank at a position to depend at least partially below a level of liquefied methane in the tank and extending to below the terminus of the feed conduit, said tank being closed and having a conical lower portion angled at least 60° from the horizontal and terminating at the bottom in an apex opening in communication with a valve, collecting methane vapor in the tank in a vapor disengaging and expansion chamber defined by the space therein above a shell having a surface of revolution extending from the top part of the cylindrical shell to the tank interior surface, withdrawing methane vapor from the vapor disengaging and expansion chamber of the tank, settling out and collecting solidified impurities in the conical lower portion of the tank as a slurry with liquefied methane, withdrawing clean liquefied methane from the tank, while maintaining the liquefied methane level in the tank, without withdrawing a significant amount of solidified impurities with it, and removing the slurry from the tank through the valve.

6. A process of separating solidified carbon dioxide and other solidifed impurities from a stream of cold natural gas, liquefied natural gas or a mixture thereof, which comprises:

feeding the stream containing the solidified impurities to a tank by means of a feed conduit terminating inside of a stilling chamber beneath the level of liquefied natural gas in the tank, said stilling chamber being defined by a cylindrical shell located in the tank at a position to depend at least partially below a level of liquefied natural gas in the tank and extending to below the terminus of the feed conduit, said tank being closed and having a conical lower portion angled at least 60° from the horizontal and terminating at the bottom in an apex opening in communication with a valve, collecting natural gas vapor in the tank in a vapor disengaging and expansion chamber defined by the space therein above a shell having a surface of revolution extending from the top part of the cylindrical shell to the tank inside surface, withdrawing purified natural gas vapor from the vapor disengaging and expansion chamber of the tank, settling out and collecting solidified impurities in the conical lower portion of the tank as a slurry with liquefied natural gas, removing the slurry from the tank through the valve, and withdrawing clean liquefied natural gas from the tank, while maintaining the liquefied natural gas level in the tank, without withdrawing a significant amount of solidified impurities with it.

7. A process according to claim 6 in which the step of withdrawing the clean liquefied natural gas includes first passing it to a weir well inside of the tank, and then withdrawing the liquefied natural gas from the well by means of a conduit communicating therewith and the tank exterior.

* * * * *

UNITED STATES PATENT AND TRADEMARK OFFICE
CERTIFICATE OF CORRECTION

PATENT NO. : 4,001,116
DATED : January 4, 1977
INVENTOR(S) : Yuksel Ali Selcukoglu It is certified that error appears in the above-identified patent and that said Letters Patent are hereby corrected as shown below:

In the Abstract, line 7, after "located" insert --in the tank at a position to depend--; line 9, after "gas" insert --which may be placed in the tank--; line 11, after "impurities" insert --into the tank and--; line 12, after "chamber" insert --at a location--; line 13, after "from" insert --the upper part of the tank, and insulation on the outside of--; line 18, after "methane" insert --in the tank--; line 26, after "out" insert --and collecting-- and before "lower" insert --conical--; line 27, after "portion" insert --of the tank--; line 28, after "slurry" insert --from the tank through the valve periodically or continuously--; line 29, before "upper" insert --internal--.
Column 6, line 6, change "hr/mole" to --mole/hr--; line 8, change "min/ft" to --ft/min--.

Signed and Sealed this

Fourteenth Day of November 1978

[SEAL]

Attest:

RUTH C. MASON
Attesting Officer

DONALD W. BANNER
Commissioner of Patents and Trademarks